United States Patent
Sato et al.

(10) Patent No.: US 7,415,349 B2
(45) Date of Patent: Aug. 19, 2008

(54) CONTROL DEVICE AND CONTROL METHOD FOR VEHICLE

(75) Inventors: Tsuyoshi Sato, Toyota (JP); Tatsuya Kawamura, Toyota (JP); Toshimitsu Sato, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/882,390

(22) Filed: Aug. 1, 2007

(65) Prior Publication Data

US 2008/0051982 A1 Feb. 28, 2008

(30) Foreign Application Priority Data

Aug. 22, 2006 (JP) .............................. 2006-225229

(51) Int. Cl.
*F02D 41/12* (2006.01)
*G06F 19/00* (2006.01)
(52) U.S. Cl. ..................................... 701/112
(58) Field of Classification Search ................ 701/112, 701/102, 101; 123/480, 198 F; 477/169, 477/84

See application file for complete search history.

(56) References Cited

U.S. PATENT DOCUMENTS 6,102,831 A * 8/2000 Wakahara et al. ........... 477/169
6,352,489 B1 * 3/2002 Kuroda et al. .................. 477/5

FOREIGN PATENT DOCUMENTS

| EP | 0 872 669 A1 | * 10/1998 |
| JP | 02-072268 A | 9/1988 |
| JP | A 2-72268 | 3/1990 |
| JP | 2004-197595 A | 12/2002 |
| JP | A 2004-197595 | 7/2004 |

* cited by examiner

*Primary Examiner*—Hieu T Vo
(74) *Attorney, Agent, or Firm*—Oliff & Berridge, PLC

(57) ABSTRACT

An ECU cuts off a fuel supply to an engine when a vehicle is decelerating. The ECU sets the cancellation of the fuel supply cut-off based on the target idle speed of the engine such that the power transfer state is prevented from switching from an engine driven state to an engine drive state even if the fuel supply to the engine is restarted. When the running condition of the vehicle satisfies the cancellation condition, the ECU then cancels the fuel supply cut-off to restart the fuel supply to the engine.

10 Claims, 7 Drawing Sheets

FIG. 3

|  | C1 | C2 | C3 | C4 | B1 | B2 | F |
|---|---|---|---|---|---|---|---|
| P | × | × | × | × | × | × | × |
| R1 | × | × | ○ | × | × | ○ | × |
| R2 | × | × | × | ○ | × | ○ | × |
| N | × | × | × | × | × | × | × |
| 1ST | ○ | × | × | × | × | ◎ | △ |
| 2ND | ○ | × | × | × | ○ | × | × |
| 3RD | ○ | × | ○ | × | × | × | × |
| 4TH | ○ | × | × | ○ | × | × | × |
| 5TH | ○ | ○ | × | × | × | × | × |
| 6TH | × | ○ | × | ○ | × | × | × |
| 7TH | × | ○ | ○ | × | × | × | × |
| 8TH | × | ○ | × | × | ○ | × | × |

○ ENGAGED
× DISENGAGED
◎ ENGAGED AT TIME OF ENGINE BRAKING
△ ENGAGED ONLY IN DRIVE STATE

CONTROL DEVICE AND CONTROL METHOD FOR VEHICLE

INCORPORATION BY REFERENCE

The disclosure of Japanese Patent Application No. 2006-225229 filed on Aug. 22, 2006 including the specification, drawings and abstract is incorporated herein by reference in its entirety.

BACKGROUND OF THE INVENTION

1. Field of the Invention

The invention relates generally to a control device and control method for a vehicle. More specifically, the invention relates to a technology that sets a cancellation condition for canceling a fuel supply cut-off to an engine.

2. Description of the Related Art

Typically, in order to enhance fuel efficiency, a "fuel supply cut-off" control that cuts off a fuel supply (injection) to an engine is executed when a vehicle is decelerating. When the running condition of the vehicle satisfies a cancellation condition for canceling the fuel supply cut-off mode, the fuel supply to the engine is restarted. Namely, the fuel supply cut-off mode is cancelled. Thus, the power transfer state is switched from an "engine driven state" in which the engine is driven by the power transferred from a transmission to an "engine drive state" in which the transmission is driven by the power from the engine. Accordingly, when the fuel supply cut-off mode is cancelled, shock may be caused. Especially, because a load due to an auxiliary mechanism driven by the power from the engine is great, the target idle speed is set to a high value. Therefore, when the engine speed is increased up to the target idle speed by canceling the fuel supply cut-off mode, the power transfer state is switched from the "engine driven state" to the "engine drive state" and shock may be caused. In order to minimize such shock, a technology for reducing the output of the engine has been proposed when the fuel supply cut-off mode is cancelled.

Japanese Patent Application Publication No. 2004-197595 (hereinafter, referred to as "JP-A-2004-197595") describes a shift control apparatus for a vehicle automatic transmission that includes an automatic transmission and a fuel supply cut-off device that cuts off a fuel supply to an engine if the engine speed exceeds a threshold value when the vehicle is decelerating. The shift control apparatus described in JP-A-2004-197595 further includes a fuel supply cut-off mode cancellation determination unit that determines whether the fuel supply cut-off performed by the fuel supply cut-off device has been cancelled and the fuel supply to the engine has been restarted; an engine drive state predicting unit that predicts whether the automatic transmission will be brought into the "engine drive state" if the fuel supply cut-off mode cancellation determination unit determines that the fuel supply to the engine has been restarted; and an engine output reduction unit that reduces the output of the engine if the engine drive state predicting unit predicts that the automatic transmission will be brought into the "engine drive state".

With the shift control apparatus described in JP-A-2004-197595, if the engine drive state predicting unit predicts that the automatic transmission will be brought into the "engine drive state" when the fuel supply cut-off mode cancellation determination unit determines that the fuel supply to the engine has been restarted, the engine output reduction unit reduces the output of the engine. It is therefore possible to appropriately suppress shock and noise that are caused even if the fuel supply to the engine is restarted.

However, in the shift control apparatus described in JP-A-2004-197595, an extra control for reducing the output of the engine needs to be executed. In addition, constants used in the control based on the output of the engine, the control for reducing the output of the engine, etc. need to be accurately set by repeating experiments and simulations. This causes the inconvenience, that is, setting the constants used in these controls takes a lot of time.

SUMMARY OF THE INVENTION

The invention provides a control device and method for a vehicle, which may suppress an increase in the time required to configure the control program.

A first aspect of the invention relates to a control device for a vehicle including a fuel supply cut-off execution unit that cuts off a fuel supply to an internal combustion engine when the vehicle is decelerating; a cancellation execution unit that cancels the fuel supply cut-off and restarts the fuel supply to the internal combustion engine when a running condition of the vehicle satisfies a predetermined cancellation condition; and a cancellation condition setting unit that sets the predetermined cancellation condition based on a target idle speed of the internal combustion engine. The predetermined cancellation condition of the fuel supply cut-off is set such that a power transfer state of the vehicle is prevented from switching from an engine driven state in which the internal combustion engine is driven by power transferred from the transmission to an engine drive state in which the transmission is driven by power from the internal combustion engine even if the fuel supply to the internal combustion engine is restarted.

Thus, shock due to switching the power transfer state may be minimized without executing an extra control for minimizing the shock such as reducing the output of the engine. Accordingly, the time required to set the constants may be decreased, which are used in the control based on the output of the engine and the control for reducing the output of the engine. As a result, it is possible to provide the control device for a vehicle that may suppress an increase in the time required to configure the control program.

A second aspect of the invention relates to control method for a vehicle including: cutting off a fuel supply to an internal combustion engine when the vehicle is decelerating; setting a cancellation condition for canceling the fuel supply cut-off such that a power transfer state of the vehicle is prevented from switching from an engine driven state in which the internal combustion engine is driven by power transferred from the transmission to an engine drive state in which the transmission is driven by power from the internal combustion engine even if the fuel supply to the internal combustion engine is restarted, based on a target idle speed of the engine; and canceling the fuel supply cut-off and restarting fuel injection to the internal combustion engine when a running condition of the vehicle satisfies the cancellation condition.

BRIEF DESCRIPTION OF THE DRAWINGS

The foregoing and further objects, features and advantages of the invention will become apparent from the following description of an example embodiment with reference to the accompanying drawings, wherein the same or corresponding portions will be denoted by the same reference numerals and wherein:

FIG. 3 is the table showing the operation chart for the automatic transmission;

DETAILED DESCRIPTION OF EMBODIMENT

Figure 1:
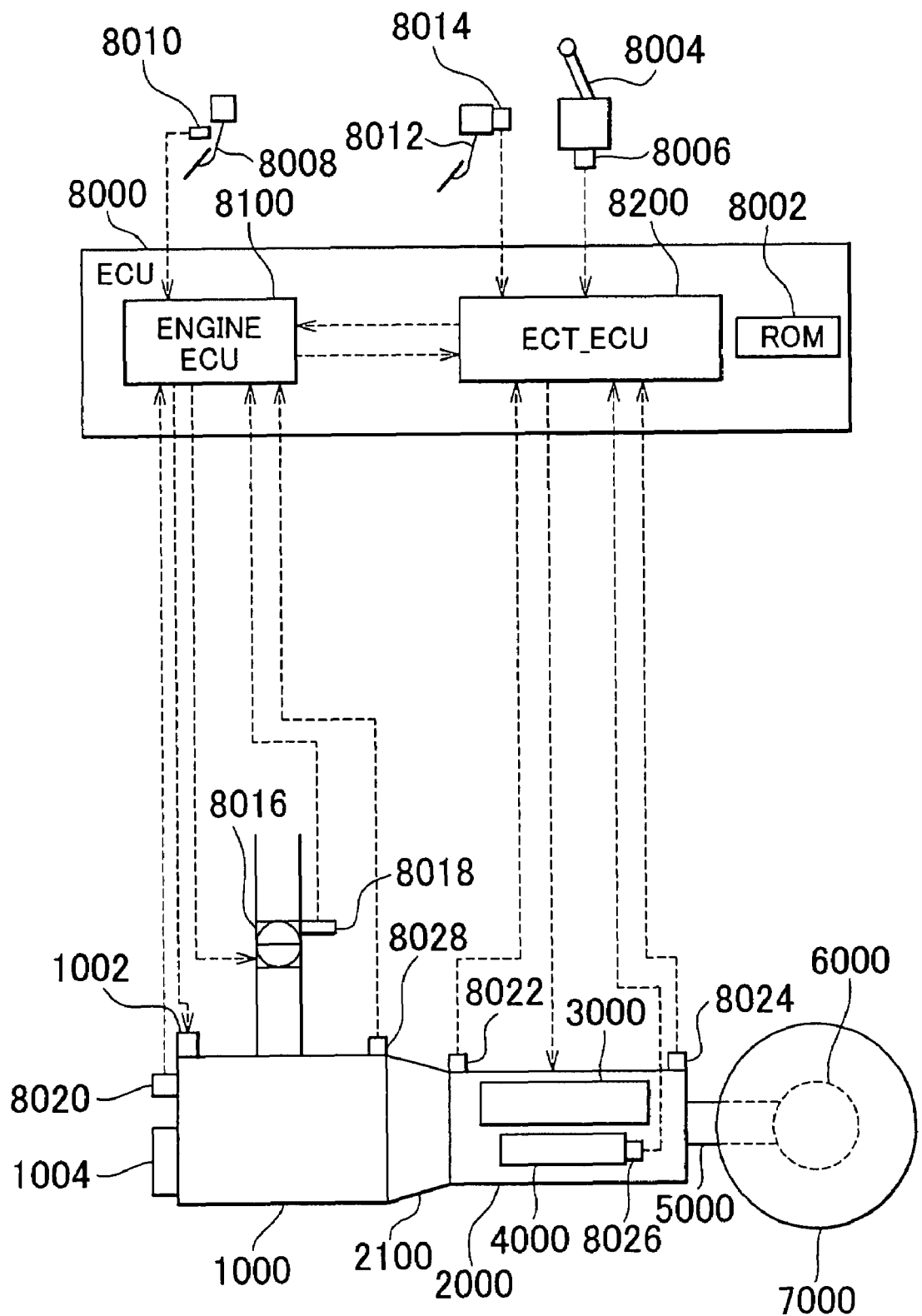
FIG. 1 is the view schematically showing the structure of a power train of a vehicle.

Hereinafter, an embodiment of the invention will be described with reference to the accompanying drawings. In the following description, the same or corresponding components are denoted by the same reference numerals. The functions and the names of the components having the same reference numeral are also the same. Accordingly, detailed description on the components having the same reference numerals will be provided only once below.

A vehicle that a control device according to the embodiment of the invention will be described with reference to FIG. 1. The vehicle in FIG. 1 is a FR (Front-engine Rear-drive) vehicle. However, the control device according to the embodiment of the invention may be mounted in vehicles other than a FR vehicle.

The vehicle includes an engine 1000, an automatic transmission 2000, a torque converter 2100, a planetary gear unit 3000 that forms a part of the automatic transmission 2000, a hydraulic circuit 4000 that forms a part of the automatic transmission 2000, a propeller shaft 5000, a differential gear unit 6000, rear wheels 7000, and an ECU (Electronic Control Unit) 8000. The control device according to the embodiment of the invention is implemented, for example, by executing a program stored in ROM (Read Only Memory) 8002 of the ECU 8000.

The engine 1000 is an internal combustion engine in which an air-fuel mixture injected from an injector 1002 is burned in a combustion chamber in a cylinder. A piston arranged in the cylinder is drawn down due to the combustion of the air-fuel mixture, whereby a crankshaft is rotated. The drive power from the engine 1000 drives an auxiliary mechanism 1004 such as an alternator and an air-conditioner. Alternatively, a motor may be used as another drive power source in addition to the engine 1000.

The automatic transmission 2000 is connected to the engine 1000 via the torque converter 2100. The automatic transmission 2000 selects a desired gear, thereby shifting the rotational speed of the crankshaft to a desired rotational speed.

The drive power that is output from the automatic transmission 2000 is transferred to the rear wheels 7000 via the propeller shaft 5000 and the differential gear unit 6000.

Connected to the ECU 8000 via, for example, a harness are: a position switch 8006 for a shift lever 8004; an accelerator pedal operation amount sensor 8010 for an accelerator pedal 8008; a depression force sensor 8014 for a brake pedal 8012; a throttle valve opening amount sensor 8018 for an electronically-controlled throttle valve 8016; an engine speed sensor 8020; an input shaft rotational speed sensor 8022 of the automatic transmission 2000; an output shaft rotational speed sensor 8024 of the automatic transmission 2000; an oil temperature sensor 8026; and a coolant temperature sensor 8028.

The position of the shift lever 8004 is detected by the position switch 8006, and a signal indicating the detection result is transmitted to the ECU 8000. The gear of the automatic transmission 2000, which corresponds to the position of the shift lever 8004, is automatically selected. Alternatively, the configuration may be such that the manual shift mode, in which a driver performs the operation to select a desired gear, is selectable.

The accelerator pedal operation amount sensor 8010 detects the operation amount of the accelerator pedal 8008, and transmits a signal indicating the detection result to the ECU 8000. The depression force sensor 8014 detects the depression force applied onto the brake pedal 8012 (i.e., the force with which the driver depresses the brake pedal 8012), and transmits a signal indicating the detection result to the ECU 8000.

The throttle valve opening amount sensor 8018 detects the opening amount of the electronically-controlled throttle valve 8016 of which the opening amount is adjusted by an actuator, and transmits a signal indicating the detection result to the ECU 8000. The amount of air taken into the engine 1000 (the output of the engine 1000) is adjusted by the electronically-controlled throttle valve 8016.

Alternatively, the amount of air taken into the engine 1000 may be adjusted by changing the lift amounts and/or the opening/closing phases of an intake valve (not shown) and an exhaust valve (not shown), instead of or in addition to by adjusting the opening amount of the electronically-controlled throttle valve 8016.

The engine speed sensor 8020 detects the rotational speed of the output shaft (the crankshaft) of the engine 1000 (i.e., the engine speed NE), and transmits a signal indicating the detection result to the ECU 8000. The input shaft rotational speed sensor 8022 detects the rotational speed NI of the input shaft of the automatic transmission 2000 (i.e. the turbine speed NT of the torque converter 2100), and transmits a signal indicating the detection result to the ECU 8000. The output shaft rotational speed sensor 8024 detects the rotational speed NO of the output shaft of the automatic transmission 2000, and transmits a signal indicating the detection result to the ECU 8000.

The oil temperature sensor 8026 detects the temperature of the oil (ATF: Automatic Transmission Fluid) used to operate and lubricate the automatic transmission 2000 (hereinafter, simply referred to as the "oil temperature"), and transmits a signal indicating the detection result to the ECU 8000.

The coolant temperature sensor 8028 detects the temperature of the coolant in the engine 1000, and transmits a signal indicating the detection result to the ECU 8000.

The ECU 8000 controls various components based on the signals from the position switch 8006, the accelerator pedal operation amount sensor 8010, the depression force sensor 8014, the throttle valve opening amount sensor 8018, the engine speed sensor 8020, the input shaft rotational speed sensor 8022, the output shaft rotational speed sensor 8024, the oil temperature sensor 8026, the coolant temperature sensor 8208, etc. and the maps and programs stored in the ROM 8002.

In the embodiment of the invention, when the D (Drive) range is selected as the shift range of the automatic transmission 2000 because the shift lever 8004 is at the D (Drive) position, the ECU 8000 controls the automatic transmission 2000 so that one of forward first to eighth gears is selected. Selecting one of forward first to eighth gears enables the automatic transmission 2000 to transfer the drive power to the rear wheels 7000. Alternatively, the configuration may be such that a gear higher than eighth gear is selectable in the D range. The gear to be selected is determined according to the shift diagram prepared in advance by experiments, etc. using the vehicle speed and the accelerator pedal operation amount as parameters.

As shown in FIG. 1, the ECU 8000 includes an engine ECU 8100 that controls the engine 1000, and an ECT (Electronic Controlled Transmission)_ECU 8200 that controls the automatic transmission 2000.

The engine ECU 8100 and the ECT_ECU 8200 may transmit and receive various signals each other. In the embodiment of the invention, signals indicating the accelerator pedal operation amount and the target idle speed of the engine 1000, are transmitted from the engine ECU 8100 to the ECT_ECU 8200.

A fuel supply cut-off signal for requiring termination of the fuel injection (i.e., requiring the execution of the fuel supply cut-off mode), and a cancellation signal for requiring restart of the fuel injection (i.e. requiring cancellation of the fuel supply cut-off mode) are transmitted from the ECT_ECU 8200 to the engine ECU 8100.

Figure 2:
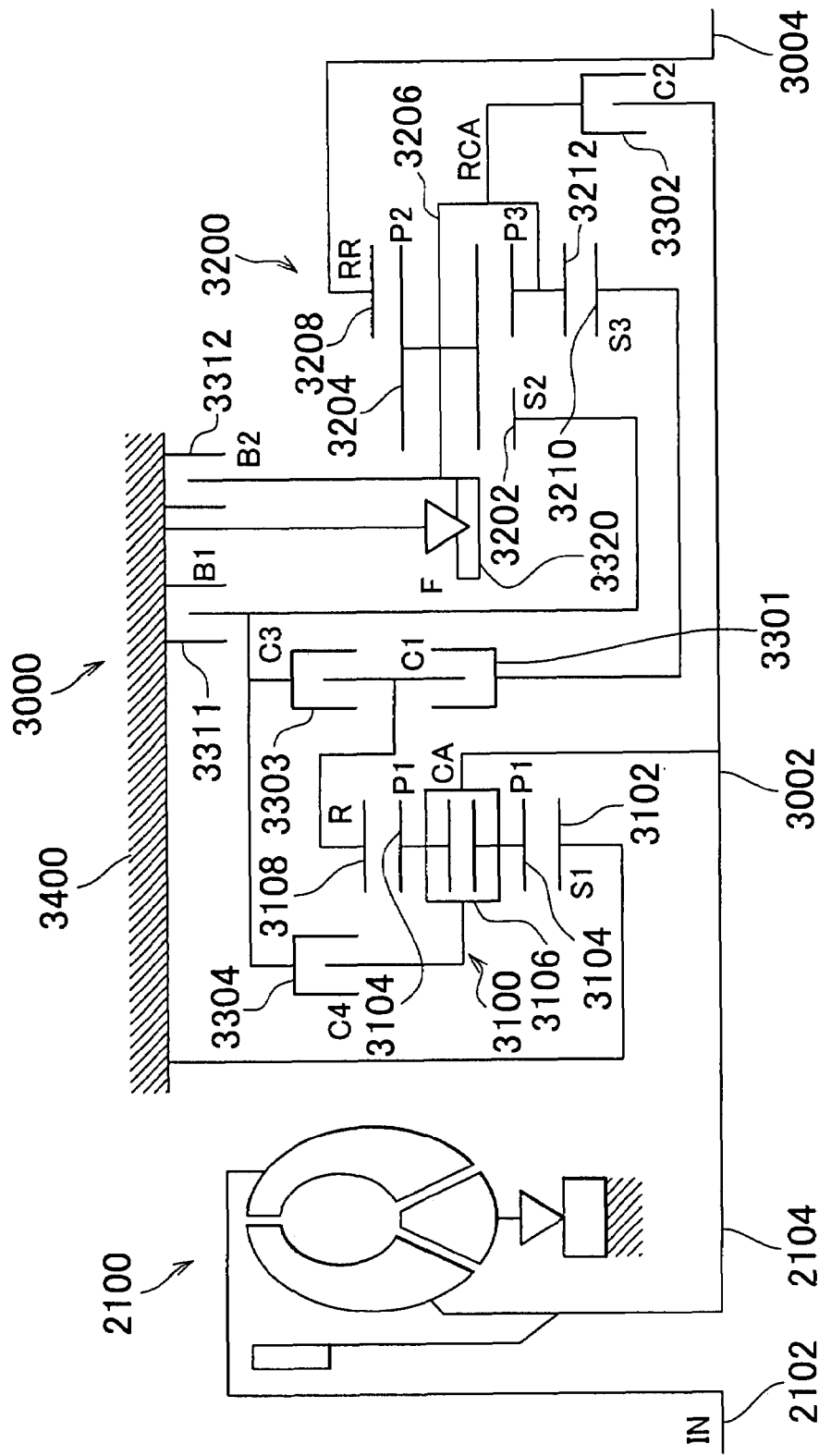
FIG. 2 is the diagram schematically showing a planetary gear unit of an automatic transmission.

The planetary gear unit 3000 will be described with reference to FIG. 2. The planetary gear unit 3000 is connected to the torque converter 2100 having an input shaft 2102 connected to the crankshaft.

The planetary gear unit 3000 includes a front planetary gear set 3100, a rear planetary gear set 3200, a C1 clutch 3301, a C2 clutch 3302, a C3 clutch 3303, a C4 clutch 3304, a B1 brake 3311, a B2 brake 3312, and a one-way clutch (F) 3320.

The front planetary gear set 3100 is a double pinion planetary gear mechanism. The front planetary gear set 3100 includes a first sun gear (S1) 3102; two sets of first pinions (P1) 3104; a carrier (CA) 3106; and a ring gear (R) 3108.

The first pinions (P1) 3104 are meshed with the first sun gear (S1) 3102 and the first ring gear (R) 3108. The first carrier (CA) 3106 supports the first pinions (P1) 3104 such that the first pinions (P1) 3104 turn around the first sun gear (S1) 3102 and rotate on their axes.

The first sun gear (S1) 3102 is fixed to a gear case 3400 so as not to rotate. The first carrier (CA) 3106 is connected to an input shaft 3002 of the planetary gear unit 3000.

The rear planetary gear set 3200 is a Ravigneaux-type planetary gear mechanism. The rear planetary gear set 3200 includes a second sun gear 3202, second pinions (P2) 3204, a rear carrier (RCA) 3206, a rear ring gear (RR) 3208, a third sun gear (S3) 3210, and third pinions (P3) 3212.

The second pinions (P2) 3204 are meshed with the second sun gear (S2) 3202, the rear ring gear (RR) 3208 and the third pinions (P3) 3212. The third pinions (P3) 3212 are meshed with the third sun gear (S3) 3210 and the second pinions (P2) 3204.

The rear carrier (RCA) 3206 supports the second pinions (P2) 3204 and the third pinions (P3) 3212 such that the second pinions (P2) 3204 turn around the second sun gear (S2) 3202, and the third pinions (P3) 3212 turn around the third sun gear (S3) 3210, respectively, and rotate on their respective axes. The rear carrier (RCA) 3206 is connected to the one-way clutch (F) 3320. When first gear is selected, the rear carrier (RCA) 3206 is not allowed to rotate. The rear ring gear (RR) 3208 is connected to an output shaft 3004 of the planetary gear unit 3000.

The one-way clutch (F) 3320 is arranged in parallel to the B2 brake 3312. Namely, the outer race of the one-way clutch (F) 3320 is fixed to the gear case 3400, and the inner race of the one-way clutch (F) 3320 is connected to the rear carrier (RCA) 3206.

FIG. 3 shows the operation chart illustrating the relationship between gears and the operating states of the clutches and brakes. Forward first to eighth gears and reverse first and second gears are each selected by operating the brakes and the clutches in the manner shown in the operation chart.

The main portion of the hydraulic circuit 4000 will be described with reference to FIG. 4. The hydraulic circuit 4000 is not limited to the one described below.

The hydraulic circuit 4000 includes an oil pump 4004, a primary regulator valve 4006, a manual valve 4100, a solenoid modulator valve 4200, a SL1 linear solenoid valve 4210, a SL2 linear solenoid valve 4220, a SL3 linear solenoid valve 4230, a SL4 linear solenoid valve 4240, a SL5 linear solenoid valve 4250, a SLT linear solenoid valve 4300, and a B2 control valve 4500.

The oil pump 4004 is connected to the crankshaft of the engine 1000. Rotation of the crankshaft drives the oil pump 4004, thereby producing a hydraulic pressure. The hydraulic pressure that is produced by the oil pump 4004 is adjusted by the primary regulator valve 4006, whereby a line pressure is produced.

The primary regulator valve 4006 operates using the throttle pressure adjusted by the SLT linear solenoid valve 4300 as a pilot pressure. The line pressure is supplied to the manual valve 4100 through a line pressure oil passage 4010.

The manual valve 4100 has a drain port 4105. The hydraulic pressures from a D-range pressure oil passage 4102 and a R-range pressure oil passage 4104 are discharged through the drain port 4105. When the spool of the manual valve 4100 is at the D-position, communication is provided between the line-pressure oil passage 4010 and the D-range pressure oil passage 4102, and a hydraulic pressure is supplied to the D-range pressure oil passage 4102. At this time, communication is provided between the R-range pressure oil passage 4104 and the drain port 4105, and the R-range pressure in the R-range pressure oil passage 4104 is discharged through the drain port 4105.

When the spool of the manual valve 4100 is at the R-position, communication is provided between the line-pressure oil passage 4010 and the R-range pressure oil passage 4104, and a hydraulic pressure is supplied to the R-range pressure oil passage 4104. At this time, communication is provided between the D-range pressure oil passage 4102 and the drain port 4105, and the D-range pressure in the D-range pressure oil passage 4102 is discharged through the drain port 4105.

When the spool of the manual valve 4100 is at the N-position, communication is provided between both the D-range pressure oil passage 4102 and the R-range pressure oil passage 4104, and the drain port 4105, whereby the D-range pressure in the D-range pressure oil passage 4102 and the R-range pressure in the R-range pressure oil passage 4104 are discharged through the drain port 4105.

The hydraulic pressure supplied to the D-range pressure oil passage 4102 is eventually supplied to the C1 clutch 3301, the C2 clutch 3302 and the B1 brake 3311. The hydraulic pressure supplied to the R-range pressure oil passage 4104 is eventually supplied to the B2 brake 3312.

The solenoid modulator valve 4200 adjusts the hydraulic pressure (solenoid modulator pressure) to be supplied to the SLT linear solenoid valve 4300 to a constant pressure using the line pressure as the original pressure.

The SL1 linear solenoid valve 4210 adjusts the hydraulic pressure to be supplied to the C1 clutch 3301. The SL2 linear solenoid valve 4220 adjusts the hydraulic pressure to be supplied to the C2 clutch 3302. The SL3 linear solenoid valve 4230 adjusts the hydraulic pressure to be supplied to the C3 clutch 3303. The SL4 linear solenoid valve 4240 adjusts the hydraulic pressure to be supplied to the C4 clutch 3304. The SL5 linear solenoid valve 4250 adjusts the hydraulic pressure to be supplied to the B1 brake 3311.

The SLT linear solenoid valve 4300 adjusts the solenoid modulator pressure according to a control signal from the ECU 8000, which is produced based on the accelerator pedal operation amount detected by the accelerator pedal operation amount sensor 8010, thereby producing the throttle pressure. The throttle pressure is supplied to the primary regulator valve 4006 through an oil passage 4302 of the SLT linear solenoid valve 4300. The throttle pressure is used as the pilot pressure for the primary regulator valve 4006.

The SL1 linear solenoid valve 4210, the SL2 linear solenoid valve 4220, the SL3 linear solenoid valve 4230, the S14 linear solenoid valve 4240, the SL5 linear solenoid valve 4250, and the SLT linear solenoid valve 4300 are controlled in accordance with control signals transmitted from the ECU 8000.

The B2 control valve 4500 selectively supplies the hydraulic pressure from one of the D-range pressure oil passage 4102 and the R-range pressure oil passage 4104 to the B2 bake 3312. The D-range pressure oil passage 4102 and the R-range pressure oil passage 4104 are connected to the B2 control valve 4500. The B2 control valve 4500 is controlled by a biasing force of spring and the hydraulic pressure supplied from a SL solenoid valve (not shown) and a SLU solenoid valve (not shown).

Figure 4:
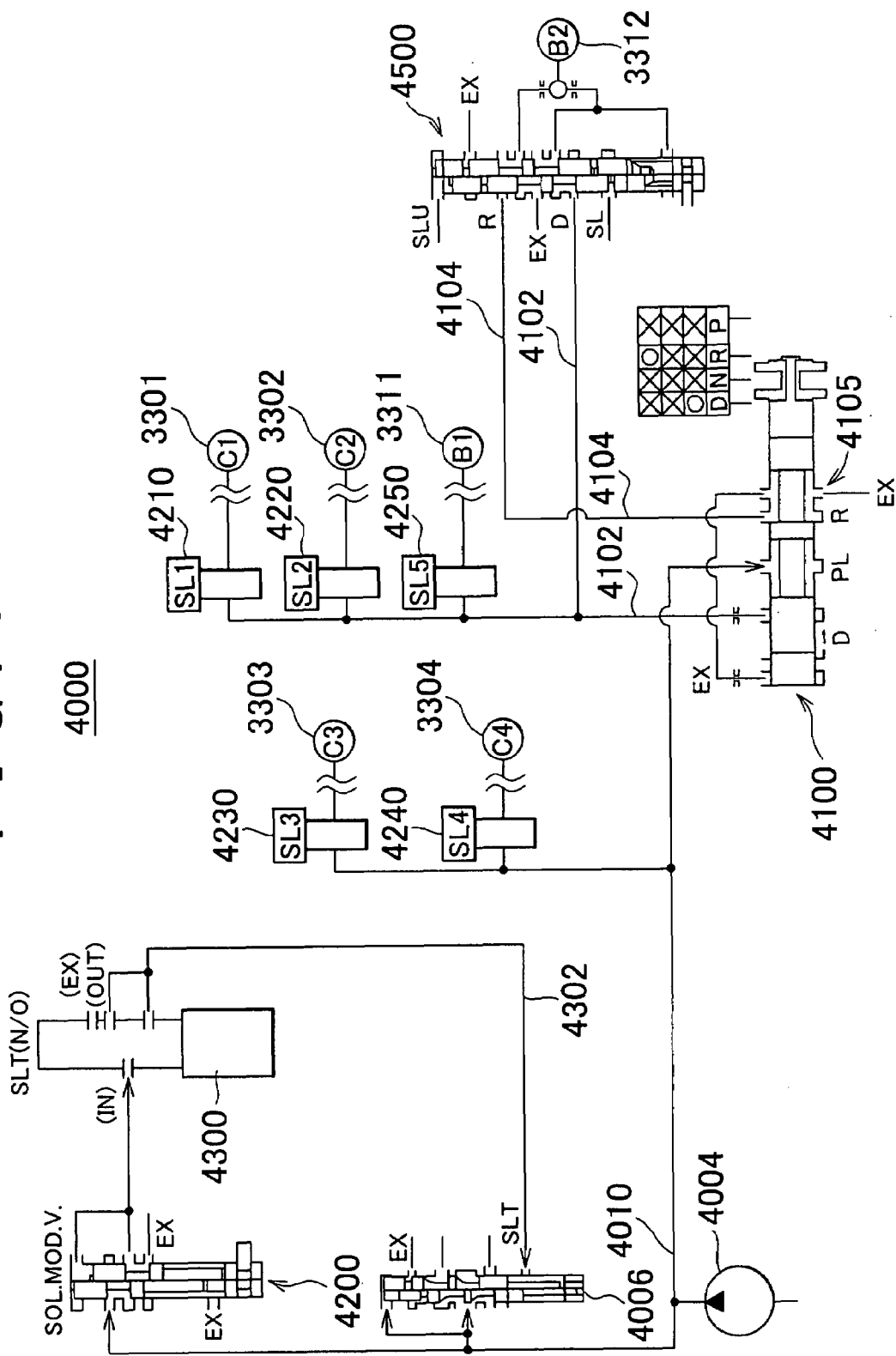
FIG. 4 is the view showing a hydraulic circuit of the automatic transmission.

When the SL solenoid valve is off and the SLU solenoid valve is on, the B2 control valve 4500 is in the left-hand state in FIG. 4. In this case, the B2 brake 3312 is supplied with the hydraulic pressure obtained by adjusting the D-range pressure using the hydraulic pressure supplied from the SLU solenoid valve as the pilot pressure.

When the SL solenoid valve is on and the SLU solenoid valve is off, the B2 control valve 4500 is in the right-hand state in FIG. 4. In this case, the B2 brake 3312 is supplied with the R-range pressure.

Figure 5:
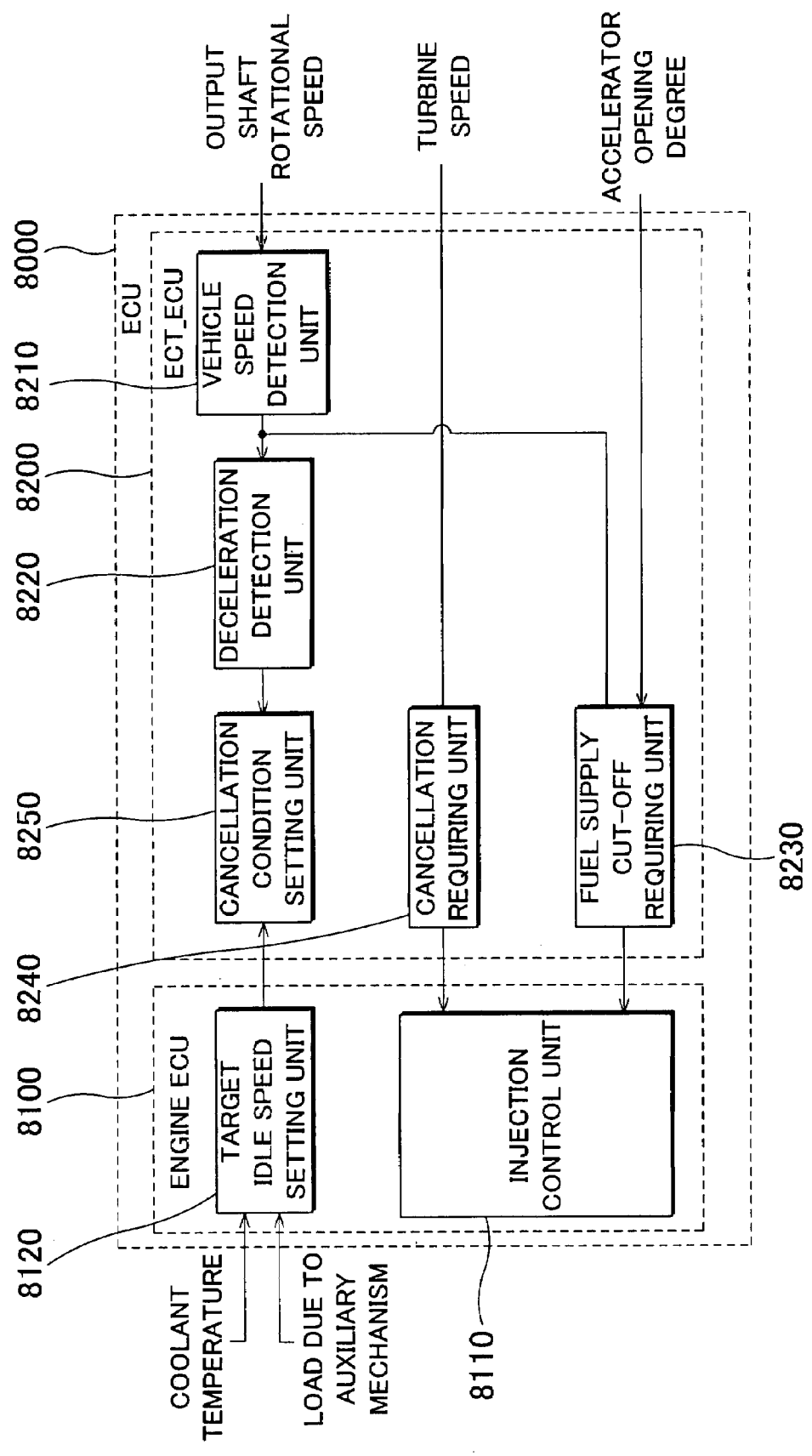
FIG. 5 is the functional block diagram of an ECU.

The ECU 8000 will be described in more detail with reference to FIG. 5. The function of the ECU 800 described below may be implemented by either hardware or software.

The engine ECU 8100 of the ECU 8000 includes an injection control unit 8110 and a target idle speed setting unit 8120.

The injection control unit 8110 controls the fuel injection from the injector 1002. The injection control unit 8110 receives a fuel supply cut-off signal from the ECT_ECU 8200 when the fuel supply cut-off condition is satisfied, which includes the condition that the accelerator pedal operation amount is zero. Then, the injection control unit 8110 controls the injector 1002 so as to stop the fuel injection.

Then, the injection control unit 8110 receives a cancellation signal from the ECT_ECU 8200 when a predetermined cancellation condition is satisfied, and controls the injector 1002 to restart the fuel injection.

The target idle speed setting unit 8120 sets the target idle speed, which is the target value of the engine speed (NE) when the engine is idling (i.e., when the accelerator pedal operation amount is zero), based on the coolant temperature, the load due to the auxiliary mechanism 1004, etc. Because the target idle speed may be set according to a known technology, detailed description concerning the method for setting the idle speed will not be provided below.

The ECT_ECU 8200 of the ECU 8000 includes a vehicle speed detection unit 8210, a deceleration detection unit 8220, a fuel supply cut-off requiring unit 8230, a cancellation requiring unit 8240, and a cancellation condition setting unit 8250.

The vehicle speed detection unit 8210 calculates (detects) the vehicle speed based on the rotational speed NO of the output shaft of the automatic transmission 2000. The deceleration detection unit 8220 calculates (detects) the deceleration of the vehicle by differentiating the vehicle speed with respect to time.

The fuel supply cut-off requiring unit 8230 outputs a fuel supply cut-off signal when the fuel supply cut-off condition is satisfied, which includes the condition that the accelerator pedal operation amount is zero. Because the fuel supply cut-off condition may be set according to a known technology, detailed description concerning the method for setting the fuel supply cut-off condition will not be provided below.

The cancellation requiring unit 8240 outputs a cancellation signal when the cancellation condition set by the cancellation condition setting unit 8250 is satisfied.

The cancellation condition setting unit 8250 sets the cancellation condition for canceling the fuel supply cut-off mode, namely, for restarting the fuel injection, using the target idle speed and the deceleration of the vehicle as parameters.

The cancellation condition includes the condition that the turbine speed NT is lower than a cancellation speed $NT_0$. The cancellation condition setting unit 8250 sets the cancellation condition by setting the cancellation speed $NT_0$, using the target idle speed and the deceleration of the vehicle as parameters. Here, the "cancellation speed $NT_0$" may be regarded as a "threshold value" of the present invention.

The higher the target idle speed is, the higher value the cancellation speed $NT_0$ is set to. Similarly, the greater the deceleration of the vehicle is, the higher value the cancellation speed $NT_0$ is set to.

In addition, the cancellation speed $NT_0$ is set such that the power transfer state is not switched from the "engine driven state" in which the engine 1000 is driven by the power transmitted from the automatic transmission 2000 to the "engine drive state" in which the automatic transmission 2000 is driven by the power transmitted from the engine 1000 when (immediately after) the fuel injection is restarted.

Figure 6:
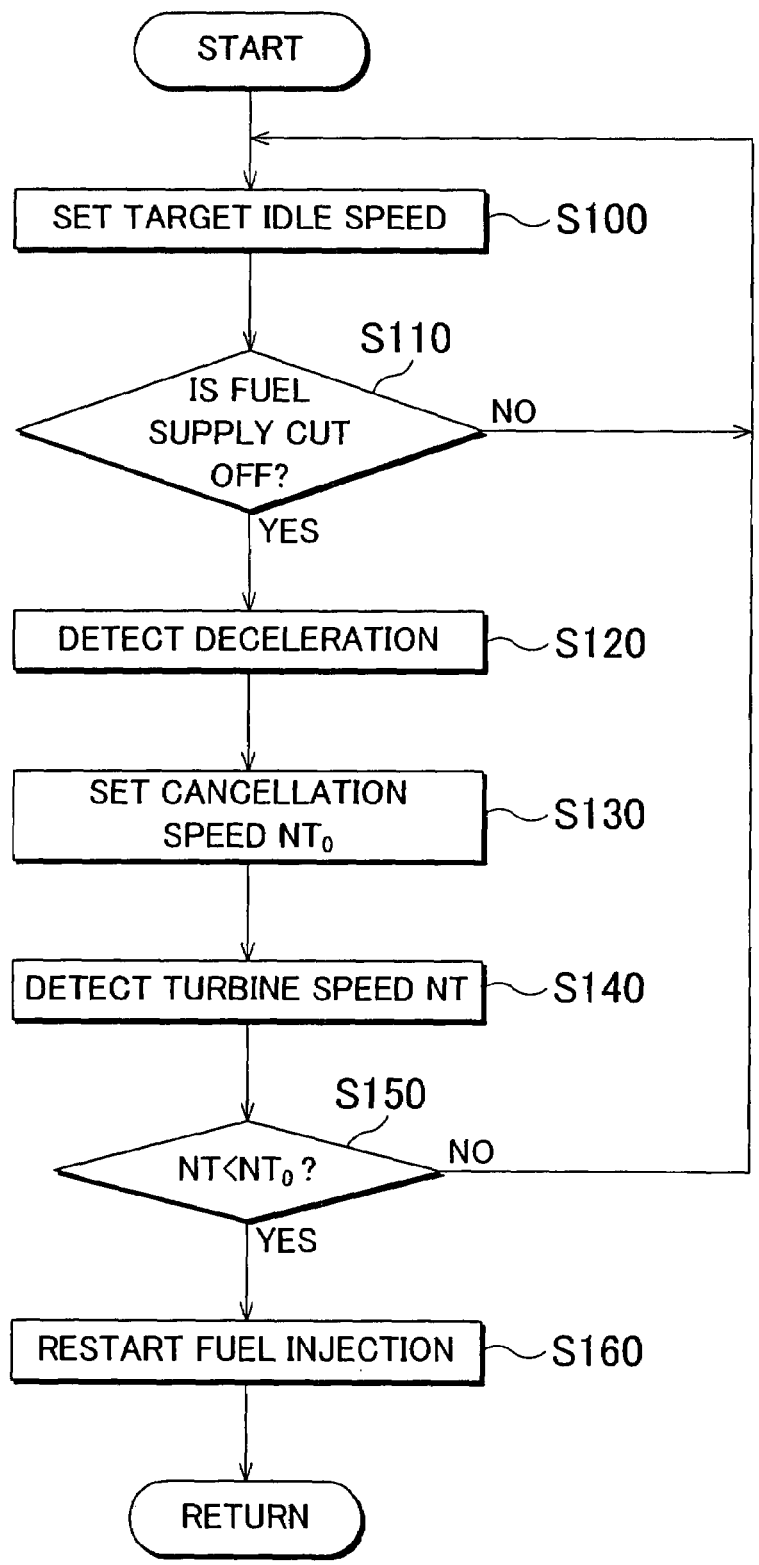
FIG. 6 is the flowchart showing the control routine executed by the ECU.

The control routine executed by the ECU 8000 according to the embodiment of the invention will be described with reference to FIG. 6. The control routine described below is executed at predetermined time intervals.

In step (hereinafter, simply referred to as "S") 100, the ECU 8000 sets the target idle speed. In S110, the ECU 8000 determines whether the fuel supply is cut off. If it is determined that the fuel supply is cut off ("YES" in S110), S120 is executed. On the other hand, if it is determined that the fuel supply is not cut off ("NO" in S110), S100 is executed again.

In S120, the ECU 8000 detects the deceleration of the vehicle. In S130, the ECU 8000 sets the cancellation speed $NT_0$ using the target idle speed and the deceleration of the vehicle as parameters. Namely, the ECU 8000 sets the cancellation condition for canceling the fuel supply cut-off mode.

In S140, the ECU 8000 detects the turbine speed NT based on a signal transmitted from the input shaft rotational speed sensor 8022.

In S150, the ECU 8000 determines whether the turbine speed NT is lower than the cancellation speed $NT_0$. If it is determined that the turbine speed NT is lower than the cancellation speed $NT_0$ ("YES" in S150), S160 is executed. On the other hand, if it is determined that the turbine speed NT is equal to or higher than the cancellation speed $NT_0$ ("NO" in S150), S100 is executed again.

In S160, the ECU 8000 restarts the fuel injection from the injector 1002. Namely, the ECU 8000 cancels the fuel supply cut-off mode.

Hereinafter, The operation of the ECU 8000 according to the embodiment of the invention will be described.

When the vehicle is decelerating, the target idle speed is set (S100). If it is determined that the fuel supply is cut off ("YES" in S110), the deceleration of the vehicle is detected (S120), and the cancellation speed $NT_0$ used as the cancellation condition for canceling the fuel supply cut-off mode is set using the target idle speed and the deceleration of the vehicle as parameters (S130).

The turbine speed NT is detected based on a signal transmitted from the input shaft rotational speed sensor 8022 (S140), and it is determined whether the turbine speed NT is lower than the cancellation speed $NT_0$ (5150).

Figure 7:
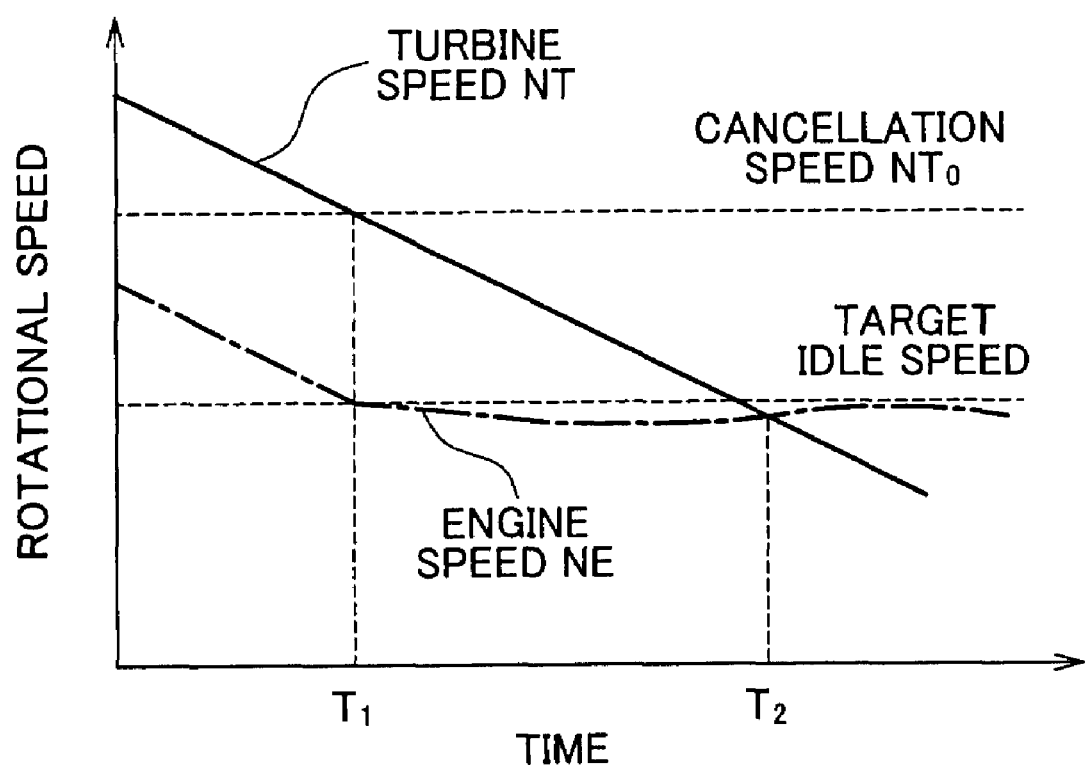
FIG. 7 is the timing chart showing time-changes in the engine speed NE and the turbine speed NT.

As shown in FIG. 7, if the turbine speed NT becomes lower than the cancellation speed $NT_0$ at time $T_1$ ("YES" in S150), the fuel injection from the injector 1002 is restarted (S160).

The higher the target idle speed is, the higher value the cancellation speed $NT_0$ is set to. Thus, if it is considered that the power transfer state is likely to be switched to the "engine drive state" even if the fuel supply is restarted due to a high target idle speed, the cancellation speed $NT_0$ may be set such that the fuel injection becomes restarted at a higher engine speed NE and a higher turbine speed NT. Accordingly, the cancellation speed $NT_0$ may be set such that a situation is avoided, where the engine speed NE increases up to the target idle speed and become higher than the turbine speed NT if the fuel injection is restarted.

The greater the deceleration of the vehicle is, the higher value the cancellation speed $NT_0$ is set to. Thus, if it is considered that the engine speed NE is likely to be higher than the turbine speed NT when the fuel injection is restarted, due to an abrupt decrease in the vehicle speed, namely, the turbine speed NT (that is, if it is considered that the power transfer state is likely to be switched from the "engine driven state" to the "engine drive state"), the cancellation speed $NT_0$ may be set such that the fuel supply becomes restarted under a higher engine speed NE and a higher turbine speed NT. Accordingly, the cancellation speed $NT_0$ may be set such that the fuel supply becomes restarted while the turbine speed NT and the target idle speed are greatly different from each other. As a result, when the fuel supply becomes restarted and the engine speed NE becomes equal to the target idle speed, the cancellation speed $NT_0$ may be set such that the engine speed NE is not higher than the turbine speed NT.

Accordingly, the cancellation speed $NT_0$ is set such that the engine speed NE does not exceed the turbine speed NT, namely, the power transfer state is not switched from the "engine driven state" to the "engine drive state" when the fuel injection becomes restarted.

Accordingly, as shown in FIG. 7, the power transfer state is not switched from the "engine driven state" to the "engine drive state" when the fuel injection is restarted at time $T_1$. When the time required to stabilize the engine speed NE has elapsed since the fuel injection is restarted, the power transfer state is switched from the "engine driven state" to the "engine drive state" at time $T_2$. In this way, shock that may be caused when the fuel injection becomes restarted may be minimized without executing an extra control such as a control for reducing the output of the engine 1000.

As described above, with the ECU according to the embodiment of the invention, the cancellation speed $NT_0$ that is used as the cancellation condition for restarting the fuel injection and canceling the fuel supply cut-off mode, is set such that the power transfer state is not switched from the "engine driven state" to the "engine drive state" when the fuel injection is restarted. In this way, shock may be minimized without executing an extra control for reducing shock such as a control for reducing the output of the engine. Accordingly, the time required to set the constants used in the control based on the output of the engine and the control for reducing the output of the engine may be decreased. As a result, an increase in the time required to configure the control program may be suppressed.

The rotational speed NO of the output shaft of the automatic transmission 2000 may be calculated based on the vehicle speed, and the product of the output shaft rotational speed NO and the gear ratio is the rotational speed NI of the input shaft of the automatic transmission 2000, namely, the turbine speed NT. Accordingly, it may be determined whether the fuel injection is restarted, based on the vehicle speed instead of the turbine speed NT.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

What is claimed is:

1. A control device for a vehicle comprising:
   a fuel supply cut-off execution unit that cuts off a fuel supply to an internal combustion engine when the vehicle is decelerating;
   a cancellation execution unit that cancels the fuel supply cut-off and restarts the fuel supply to the internal combustion engine when a running condition of the vehicle satisfies a predetermined cancellation condition; and
   a cancellation condition setting unit that sets the predetermined cancellation condition of the fuel supply cut-off based on a target idle speed of the internal combustion engine, the predetermined cancellation condition being set such that a power transfer state of the vehicle is prevented from switching from an engine driven state in which the internal combustion engine is driven by power transferred from the transmission to an engine drive state in which the transmission is driven by power from the internal combustion engine even if the fuel supply to the internal combustion engine is restarted.

2. The control device for a vehicle according to claim 1, wherein
   the predetermined cancellation condition includes a condition that a rotational speed of an input shaft of the transmission is lower than a threshold value, and
   the cancellation condition setting unit sets the threshold value based on the target idle speed of the internal combustion engine.

3. The control device for a vehicle according to claim 2, wherein
   the cancellation condition setting unit sets the threshold value to a higher value as a deceleration of the vehicle becomes greater.

4. The control device for a vehicle according to claim 2, wherein
   the cancellation condition setting unit sets the threshold value to a higher value as the target idle speed of the internal combustion engine becomes higher.

5. The control device for a vehicle according to claim 2, wherein
   the rotational speed of the input shaft of the transmission is a turbine speed of a torque converter that is provided between the internal combustion engine and the transmission.

6. The control device for a vehicle according to claim 1, wherein
the predetermined cancellation condition includes a condition that a vehicle speed is lower than a threshold value, and
the cancellation condition setting unit sets the threshold value based on the target idle speed of the internal combustion engine.

7. The control device for a vehicle according to claim 6, wherein
the cancellation condition setting unit sets the threshold value to a higher value as a deceleration of the vehicle becomes greater.

8. The control device for a vehicle according to claim 6, wherein
the cancellation condition setting unit sets the threshold value to a higher value as the target idle speed of the internal combustion engine becomes higher.

9. The control device for a vehicle according to claim 1, wherein
the power transfer state is switched from the engine driven state to the engine drive state when a predetermined time has elapsed since the fuel supply to the internal combustion engine is restarted.

10. A control method for a vehicle comprising:
cutting off a fuel supply to an internal combustion engine when the vehicle is decelerating;
setting a cancellation condition of the fuel supply cut-off such that a power transfer state of the vehicle is prevented from switching from an engine driven state in which the internal combustion engine is driven by power transferred from a transmission to an engine drive in which the transmission is driven by power from the internal combustion engine even if the fuel supply to the internal combustion engine is restarted, based on a target idle speed of the engine; and
canceling the fuel supply cut-off and restarting fuel injection to the internal combustion engine when a running condition of the vehicle satisfies the cancellation condition.

* * * * *